United States Patent
Byun et al.

(10) Patent No.: US 9,718,010 B2
(45) Date of Patent: Aug. 1, 2017

(54) OIL FILTER ASSEMBLY HAVING ROTATION TYPE DRAIN PIN

(71) Applicant: Mahle International GmbH, Stuttgart (DE)

(72) Inventors: Sangpil Byun, Ansan-Si (KR); Giwon Park, Ansan-Si (KR)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/939,818

(22) Filed: Nov. 12, 2015

(65) Prior Publication Data
US 2016/0136548 A1    May 19, 2016

(30) Foreign Application Priority Data
Nov. 13, 2014   (KR) .................. 10-2014-0158180

(51) Int. Cl.
*B01D 35/153* (2006.01)
*B01D 35/30* (2006.01)
(Continued)

(52) U.S. Cl.
CPC ........... *B01D 35/153* (2013.01); *B01D 29/21* (2013.01); *B01D 35/005* (2013.01);
(Continued)

(58) Field of Classification Search
CPC .... B01D 35/00; B01D 35/005; B01D 35/153; B01D 35/147; B01D 35/16; B01D 35/30;
(Continued)

(56) References Cited

U.S. PATENT DOCUMENTS 4,177,529 A * 12/1979 Sikula, Jr. .............. B01D 27/00
                                                         141/330
8,522,415 B2 * 9/2013 Macey ................... B01D 35/16
                                                         123/196 A
(Continued)

FOREIGN PATENT DOCUMENTS

DE     202005002955 U1    7/2006
DE     102007009352 A1    8/2008
(Continued)

OTHER PUBLICATIONS

English Abstract for JP 2004346929A.
(Continued)

*Primary Examiner* — Robert Clemente
*Assistant Examiner* — Akash Varma
(74) *Attorney, Agent, or Firm* — Fishman Stewart PLLC (57) ABSTRACT

An oil filter module may include a casing and a filter therein. The oil filter module may also include a cap coupled to the casing, and including a drain nipple protruding downward from a portion of the cap corresponding to a bottom support plate of the filter with a drain hole formed in the drain nipple. The oil filter module may further include a drain pin coupled to the drain nipple so as to be removable so that the drain hole is open or closed by the drain pin. A rotation groove having a rotating axis of the casing may be formed in a lower surface of the bottom support plate. The drain hole may be formed at a position corresponding to the rotation groove, and the drain pin may be seated at one end thereof onto a bottom of the rotation groove when the drain pin is coupled to the drain nipple.

15 Claims, 11 Drawing Sheets (51) Int. Cl.
*B01D 35/00* (2006.01)
*F02M 37/22* (2006.01)
*B01D 35/147* (2006.01)
*B01D 35/16* (2006.01)
*B01D 29/21* (2006.01)

(52) U.S. Cl.
CPC ............ B01D 35/147 (2013.01); B01D 35/16 (2013.01); B01D 35/30 (2013.01); F02M 37/22 (2013.01); *B01D 2201/291* (2013.01); *B01D 2201/4015* (2013.01); *B01D 2201/4076* (2013.01); *B01D 2201/4084* (2013.01)

(58) Field of Classification Search
CPC .............. B01D 29/21; B01D 2201/291; B01D 2201/4015; B01D 2201/4076; B01D 2201/4084; F02M 37/22
USPC ........................................................ 210/435
See application file for complete search history.

(56) References Cited

U.S. PATENT DOCUMENTS

| | | |
|---|---|---|
| 2008/0190832 A1 | 8/2008 | Schachtrup et al. |
| 2008/0202081 A1 | 8/2008 | Schmid et al. |
| 2012/0160756 A1* | 6/2012 | Hirsch ................. B01D 27/106 210/248 |
| 2012/0234743 A1* | 9/2012 | Braunheim .......... B01D 35/153 210/232 |
| 2012/0261326 A1 | 10/2012 | Deschamps et al. |
| 2013/0043173 A1* | 2/2013 | Kiemlen ................ B01D 29/21 210/167.02 |
| 2013/0264265 A1 | 10/2013 | Lin |
| 2016/0136548 A1 | 5/2016 | Byun et al. |

FOREIGN PATENT DOCUMENTS

| | | |
|---|---|---|
| DE | 102009049868 A1 | 4/2011 |
| DE | 102014000715 A1 | 7/2015 |
| EP | 3034147 A1 | 6/2016 |
| JP | 2003512165 A | 4/2003 |
| JP | 2004346929 A | 12/2004 |
| KR | 100775520 B1 | 11/2007 |
| KR | 102012007926 | 7/2012 |
| KR | 10-1190220 B1 | 10/2012 |

OTHER PUBLICATIONS

English Abstract for JP 2003512165A.
Englihs abstract provided for KR-10-1190220.
European Search Report for EP15194123 dated May 20, 2016.
English Abstract for DE202005002955U1.
English Abstract for DE102014000715A1.
English Abstract for KR100775520B1.
International Search Report for PCT/EP2015/076463, dated Jul. 15, 2016.

* cited by examiner

OIL FILTER ASSEMBLY HAVING ROTATION TYPE DRAIN PIN

CROSS-REFERENCE TO RELATED APPLICATIONS

This application claims priority to Korean Patent Application No. 10-2014-0158180, filed Nov. 13, 2014, the contents of which are hereby incorporated by reference in their entirety.

TECHNICAL FIELD

The present invention relates to an oil filter assembly used for filtering engine oil and in particular discloses that the oil filter assembly on an oil filter combines a rotary drain pin used for discharging engine oil.

BACKGROUND

As we all know, when an engine is driven, engine oil is supplied to the friction parts of the engine to lubricate and cool them. As the engine keeps on working, the engine oil is contaminated by oxides and various impurities produced when metal particles, carbon particles, and engine oil are oxidated. If the engine continues to run when the engine oil is contaminated, rotating friction parts such as crankshaft and oil cylinder are gradually worn out and become damaged. If the conditions further worsen, these parts may be sintered causing a risk of safety accidents.

As described above, it is very important to continuously keep engine oil clean because it directly affects the service life and performance of the engine. Therefore, an oil filter assembly needs to be set on the engine oil circulation path to continuously keep engine oil clean.

The following describes in detail the existing oil filter assembly with reference to the drawings.

Figure 1:
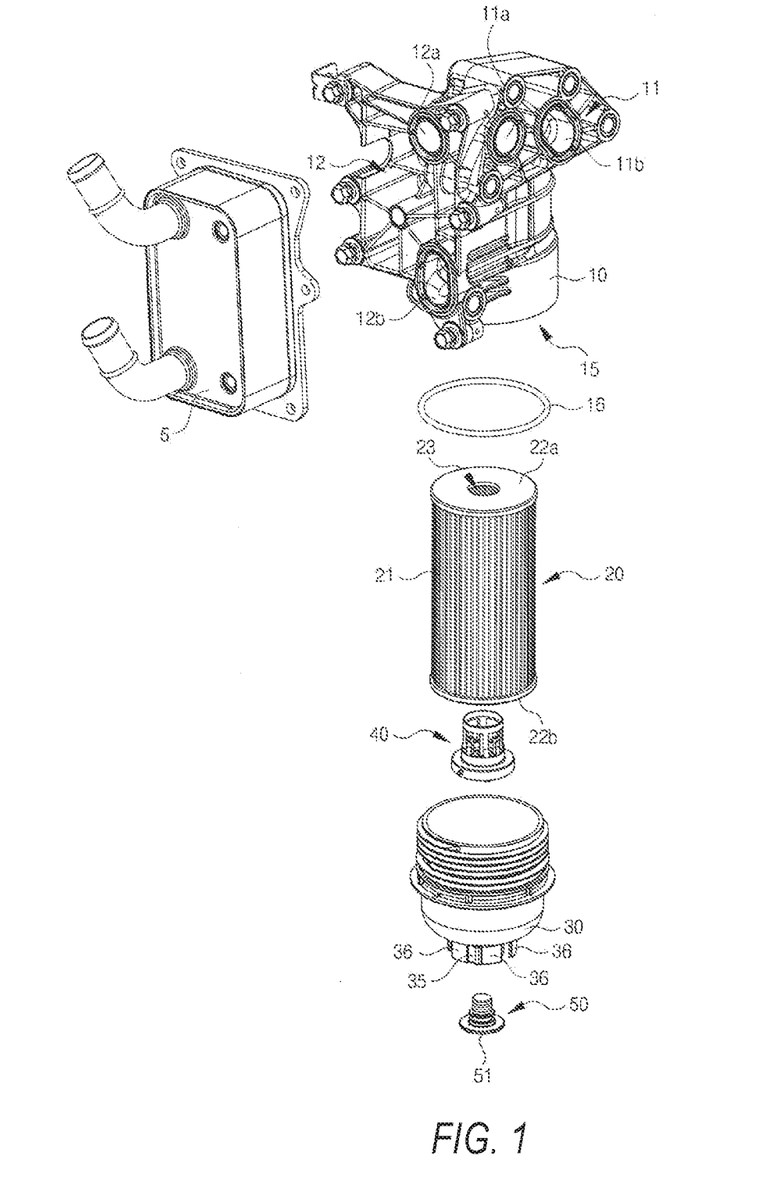
FIG. 1 is an exploded oblique view of the existing oil filter assembly.
Figure 2:
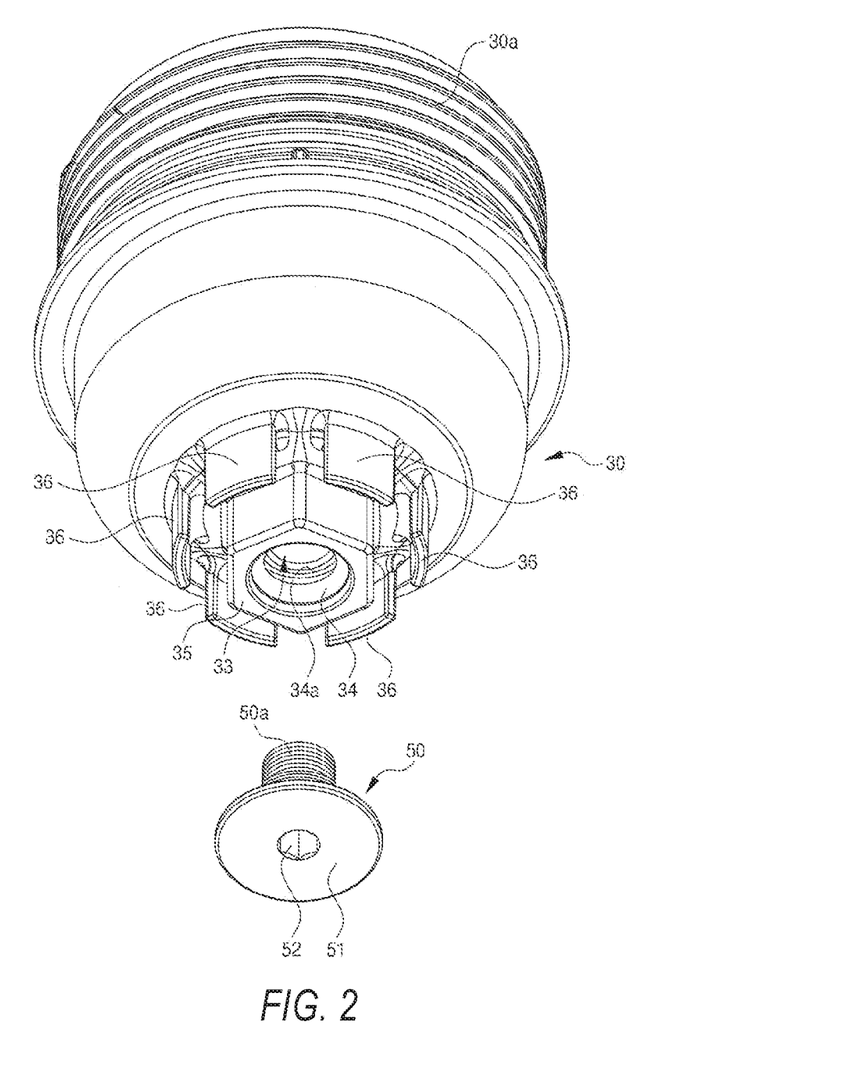
FIG. 2 shows the structure of the drain bolt installed on the cap of the existing oil filter assembly.

FIG. 1 is an exploded oblique view of the existing oil filter assembly and FIG. 2 shows the structure of the drain bolt installed on the cap of the existing oil filter assembly.

The existing oil filter assembly comprises the following structures: a casing (10), a replaceable oil filter (20) set in the casing (10), and a detachable cap (30) combined at the opening (15) of the casing (10). A first installation part (11) and a second installation part (12) are formed on the other side of the casing (10). The first installation part (11) is installed on the engine side (not shown in the figure) with a plurality of connection pieces, while the second installation part (12) is installed on the engine oil cooler side (5) with a plurality of connection pieces. In addition, a first oil return hole (11a) connected to the engine (not shown in the figure) and a drain hole (11b) are formed on the first installation part (11), while a second oil return hole (12a) connected to the engine oil cooler (5) and an oil inlet hole (12b) are formed on the second installation part (12). Therefore, contaminated engine oil in the internal circulation of the engine (not shown in the figure) flows through the first oil return hole (11a) and the second oil return hole (12a) into the engine oil cooler (5), and contaminated engine oil is cooled in the engine oil cooler (5). After engine oil cooled in the engine oil cooler (5) flows through the oil inlet hole (12b) into the casing (10) and is filtered by the filter (20) in the casing (10), it is supplied to the engine side (not shown in the figure) through the drain hole (11b).

The filter (20) comprises filter paper (21) corrugated along the circumference and a support supporting the filter paper (21). In addition, a top support plate (22a) and a bottom support plate (22b) are respectively equipped at the top and bottom of the support to support the top and bottom of the filter paper (21), and a flow path (23) which engine oil passes by is formed along the centre of the support.

The cap (30) can detachably be combined with the opening (15) of the casing (10), an external screw part (30a) is formed on the external circumferential surface of the top of the cap (30), and the external screw part (30a) is combined with the internal screw part formed on the internal circumferential surface of the opening (15). In addition, a sealing element (16) is set between the cap (30) and the casing (10), and the cap (30) and the casing (10) are combined in a sealing manner. A bypass valve (40) is formed at the bottom of the flow path (23) of the support, and the bypass valve (40) is combined with the inner side at the centre of the cap (30).

In addition, the nut boss (35) at the centre of the bottom of the cap (30) protrudes downwards, and the metallic drain bolt (50) can detachably be combined with the drain hole (33) in the boss (35). A metallic nut fitting (34) is integrated on the internal circumferential surface of the drain hole (33) by means of insertion and injection and an internal screw part (34a) is formed on the internal circumferential surface of the nut fitting (34). Next, since the external screw part (50a) of the metallic drain bolt (50) is detachably combined with the internal screw part (34a) of the nut fitting (34) in screwed connection mode, the drain bolt (50) can firmly be fixed to the drain hole (33) side of the cap (30). Further, a sealing element (55) is set between the external circumferential surface of the drain bolt (50) and the internal circumferential surface of the nut fitting (34) to ensure the tightness between the drain bolt (50) and the nut fitting (34).

A connecting groove (52), where a wrench can be inserted, is formed at the centre of the head end (51) of the drain bolt (50) and an internal screw part (50a) is formed on the external circumferential surface of the drain bolt (50). As described above, the external screw part (50a) can detachably be combined with the internal screw part (34a) of the drain hole (33). Therefore, when the operator turns the drain bolt (50) to remove it from the cap (30), the drain hole (33) in the cap (30) is opened and engine oil inside said oil filter assembly is discharged out through said drain hole (33).

However, as described above, if the drain bolt (50) is combined with the drain hole (33) in screwed connection mode, when said drain bolt (50) is removed, engine oil flows out of the cap (30), and the drain bolt (50), the working tool, and the hands of the operator get contaminated with engine oil. In addition, it takes a long time to remove the drain bolt (50), and engine oil leaks when the drain bolt (50) is slightly loosened under the action of an external force. These are all disadvantages of the existing oil filter assembly.

PRIOR ART DOCUMENTS (Patent document 0001) KR 10-1190220 B1

SUMMARY

To solve the above-mentioned problems, the present invention is intended to provide an oil filter assembly which integrates the drain pin and the filter so that the separation of said drain pin, not desired by the operator, will not happen, said drain pin can quickly be removed to improve the operation efficiency, and the drain bolt or the tool can be prevented from being contaminated with engine oil.

To achieve the above-mentioned objects, the oil filter assembly in the present invention comprises the following structures: a casing with an open end; a filter which is inserted in said casing and further comprises a pipe support having a plurality of openings in the side wall, filter paper surrounding the external circumferential surface of said support, a top support plate which is combined with said support and can cover the top of said filter paper, and a bottom support plate which is combined with said support and can cover the bottom of said filter paper; a cap which is combined with said casing in screwed connection mode and can cover the open end of said casing, with the drain nipple having a drain hole protruding downward from the position corresponding to the bottom support plate; a drain pin which is detachably combined with said drain nipple to open/close the drain hole in said drain nipple. In addition, an annular rotation groove with the rotation axis of said casing being its central axis is formed on the bottom surface of said bottom support plate and said drain hole is formed in the position corresponding to said rotation groove. When said drain pin is combined with said drain nipple, one end is placed on the bottom surface of said rotation groove.

Said drain pin comprises the following structures: a body which is inserted into said drain hole in fit mode; a slide block which is located at one lengthwise end of said body and placed on the bottom surface of said rotation groove and can slide along said rotation groove as said cap rotates in the screwed connection direction; a handle which is located at the other lengthwise end of said body and is exposed to the outside of said drain nipple; a sealing element which surrounds the external circumferential surface of said body.

The entrance width of said rotation groove is smaller than the bottom surface width, the lateral length of said slide block is greater than the entrance width of said rotation groove, and the longitudinal length of said slide block is smaller than the entrance width of said rotation groove.

Said slide block is made of a material with elasticity above the standard value. When said drain pin rotates to keep said slide block laterally aligned to the radial direction of said rotation groove, the lateral end of said slide block touches the internal side wall of said rotation groove.

The lateral end of said slide block is in the curved shape and the curvature is the same as that of the internal side wall of said rotation groove.

Marking grooves are formed in the radial direction of said drain nipple on the protruding end, said handle is extended downward and is in the shape of a plate, and when said drain pin rotates to keep said slide block laterally aligned to the radial direction of said rotation groove, the two widthwise ends of said handle are matched to said marking grooves.

The oil filter assembly in the present invention integrates the drain pin and the filter so that the separation of said drain pin, not desired by the operator, will not happen, said drain pin can quickly be removed to improve the operation efficiency, and the drain bolt or the tool can be prevented from being contaminated with engine oil.

DETAILED DESCRIPTION

The following describes in detail an embodiment of the oil filter assembly in the present invention with reference to the drawings.

Figure 3:
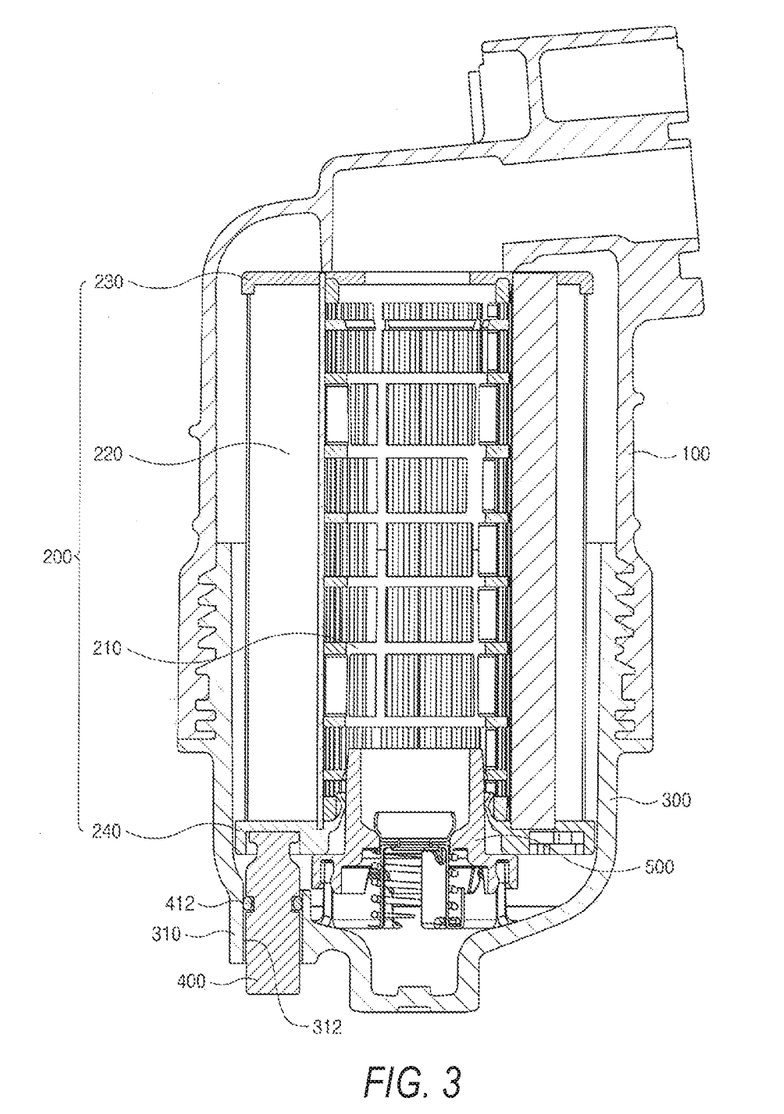
FIG. 3 is a vertical section view of the oil filter assembly in the present invention.
Figure 4:
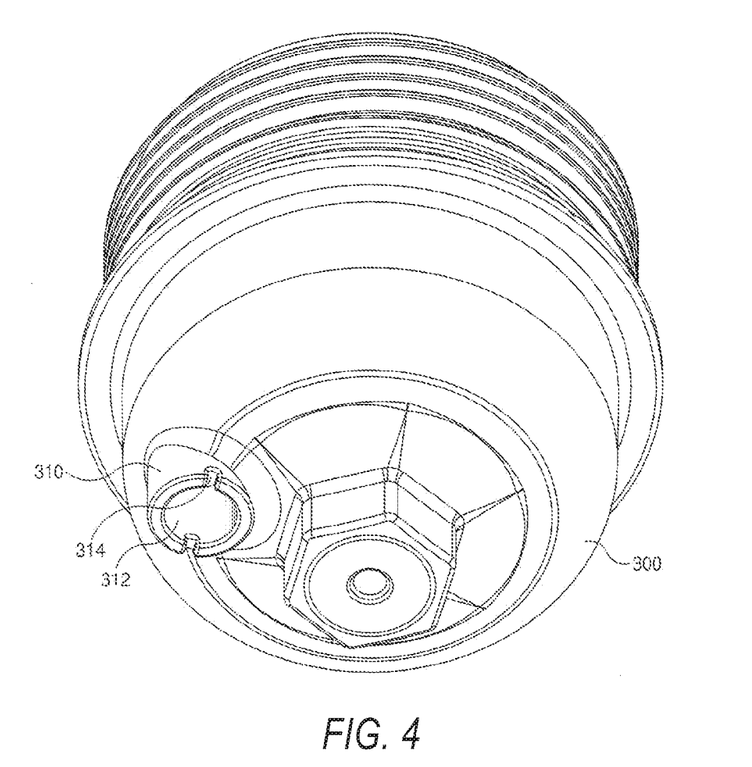
FIG. 4 is an oblique bottom view of the cap of the oil filter assembly in the present invention.
Figure 5:
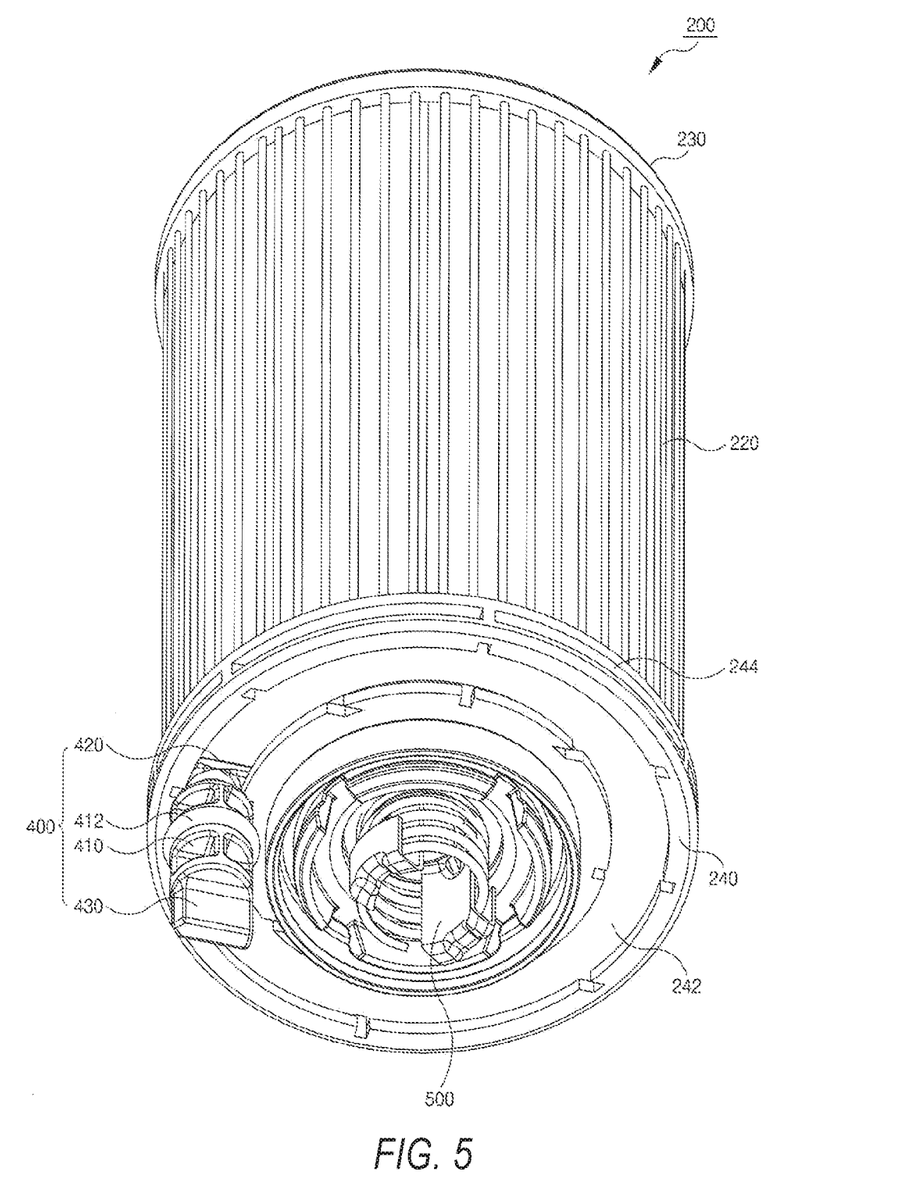
FIG. 5 is an oblique bottom view of the combined drain pin and filter.

FIG. 3 is a vertical section view of the oil filter assembly in the present invention, FIG. 4 is an oblique bottom view of the cap of the oil filter assembly in the present invention, and FIG. 5 is an oblique bottom view of the combined drain pin and filter.

The oil filter assembly in the present invention is a device which filters engine oil supplied to a vehicle engine and then supplies the filtered oil to the engine again. The oil filter assembly comprises the following structures: a casing (100) with an open end (lower end in FIG. 1), a filter (200) inserted into said casing (100), a cap (300) which is combined with said casing (100) in screwed connection mode and can cover the open end of said casing (100), with the drain nipple (310) having a drain hole (312) protruding downward from the position corresponding to the bottom support plate (240), and a drain pin (400) which is detachably combined with said drain nipple (310) to open/close the drain hole (312) in said drain nipple (310).

Said drain hole (312) is formed at the bottom surface of the cap (300). If the casing (100) and the cap (300) are filled with engine oil, the engine oil contained by said casing (100) and cap (300) will be discharged out through said drain hole (312) when the drain pin (400) is removed and the drain hole (312) is opened. On the contrary, as shown in FIG. 3, after the drain pin (400) is inserted into the drain nipple (310), engine oil flowing into the casing (100) and the cap (300) will not leak out if the drain hole (312) is closed, and engine oil filtered by the filter (200) is re-supplied to the engine. When engine oil flowing into the casing (100) and the cap (300) passes the filter (200) and is re-supplied to the engine, the flow path of engine oil is the same as that in the existing oil filter assembly. Therefore, a detailed description of the filtering principle and flow path of engine oil is omitted here.

In this case, if the part where the drain hole (312) is formed is manufactured thin, the following problem exists: after the drain pin (400) is inserted and the drain hole (312) is blocked, said drain pin (400) may incline to one side and easily fall into the drain hole. Therefore, as shown in the embodiment, the part where the drain hole (312) is formed on the bottom surface of said cap (300) is preferably manufactured into a downward-extended pipe shape so as to increase the area of contact with the drain pin (400).

To prevent the drain pin 400 from unwished falling out of the drain hole 312, a safety pin 700 can be provided, like shown in the FIGS. 3 and 11 to 13. The safety pin 700 is made of plastic, especially as a one piece molded plastic element, and is inserted in a through-hole 600, going through the drain nipple 310 and the safety pin 700. The safety pin 700 also prohibits twisting of the drain pin 400, so that the slide block 420 is fixed in the rotation groove 242. The through-hole 600 crosses the safety pin 700 below the sealing element 412, so that the sealing effect of the sealing element 412 is not affected.

Figure 13:
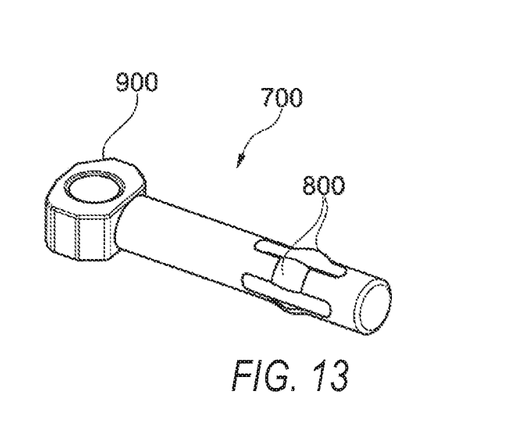
FIG. 13 shows an embodiment of a possible safety pin.

As it can be seen in FIG. 13, the safety element 700 has elastic elements 800, which grab behind an edge of the through-hole 600, when the safety pin 700 is fully inserted in the through-hole 600, and thus provide a barrier for extract the safety pin 700 out of the through-hole 600. To clamp the safety pin 700, it has a handle 900. The through-hole 600 is going through the safety pin 700 as well as through the walls of the drain nipple 310. The safety pin 700 also prevents an erroneous assembly, because it only can be inserted into the through-hole 600, if the safety pin 700 and the whole oil filter 200 is assembled in a correct manner.

Further, compared with the drain bolt (50) combined with the cap (30) in screwed connection mode in the existing oil filter assembly shown in FIG. 1 and FIG. 2, the drain pin (400) which opens/closes said drain hole (312) is combined with the drain nipple (310) in fit mode in the oil filter assembly in the present invention and thus the tightness of the drain hole (312) may decrease. Therefore, the external circumferential surface of said drain pin (400) is preferably equipped with an O-ring sealing element (412). In this case, if the part where the drain hole (312) is formed is thin, the sealing element (412) may fall off the internal circumferential surface of the drain hole (312), depending on the insertion distance of the drain pin (400), and thus, the drain hole (312) may be opened, which is not desired by the operator. However, as shown in the embodiment of the present invention, when the drain hole (312) is formed in the drain nipple (310), the contact distance between the drain pin (400) and the drain nipple (310) is extended. Thus, even if the insertion distance of said drain pin (400) is slightly changed, said sealing element (412) will still stay on the internal circumferential surface of the drain hole (312) to increase the reliability of the tightness of the drain hole (312).

Further, in the oil filter assembly in the present invention, said drain pin (400) is inserted into the drain nipple (310) in fit mode, instead of screwed connection mode, and therefore the time necessary for opening/closing the drain hole (312) can be reduced significantly. Further, it is necessary to rotate the existing drain bolt (50) for several turns before removing the existing drain bolt (50), and therefore, engine oil will flow out and contaminate said drain bolt (50), the working tool, or the hands of the operator when said drain bolt (50) is removed. In the present invention, however, when the drain pin (400) is pulled downward, it can be separated from the drain nipple (310) instantaneously, and therefore, engine oil will not flow out of the drain hole (312) and contaminate the drain pin (400) or hands of the operator.

Further, said filter (200) comprises a pipe support (210) having a plurality of openings in the side wall, filter paper (220) surrounding the external circumferential surface of said support (210), a top support plate (230) which is combined with said support (210) and can cover the top of said filter paper (220), and a bottom support plate (240) which is combined with said support (210) and can cover the bottom of said filter paper (220). Further, a bypass valve (500) is equipped at the bottom of the internal flow path of the support (210), that is to say, when the service life of said filter paper (220) ends and cannot filter engine oil normally, engine oil supplied to the inside of said casing (100) moves to the outside of said casing (100) in a roundabout way through the internal flow path in the support (210). In this case, said casing (100), support (210), and filter paper (220), top support plate (230), and bypass valve (500) are essentially the same as those in the existing oil filter assembly. A detailed description of these structures is omitted here.

Figure 6:
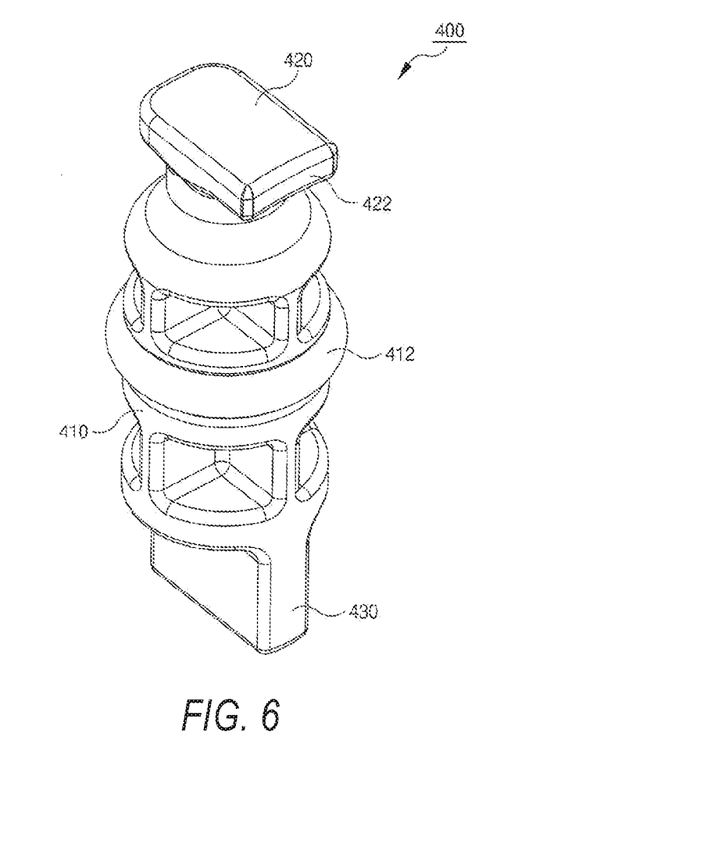
FIG. 6 is an oblique view of the drain pin.
Figure 7:
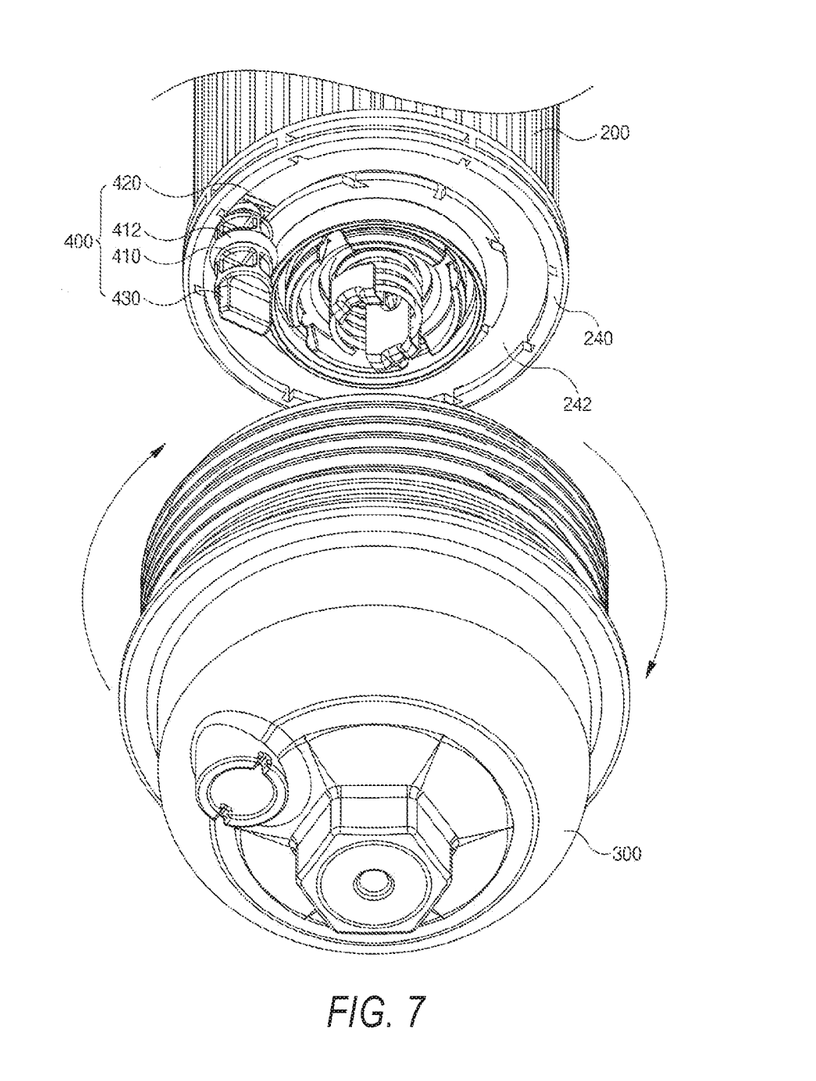
FIG. 7 is an oblique view of the drain pin sliding along the rotation groove when the cap is combined with the casing in screwed connection mode.
Figure 8:
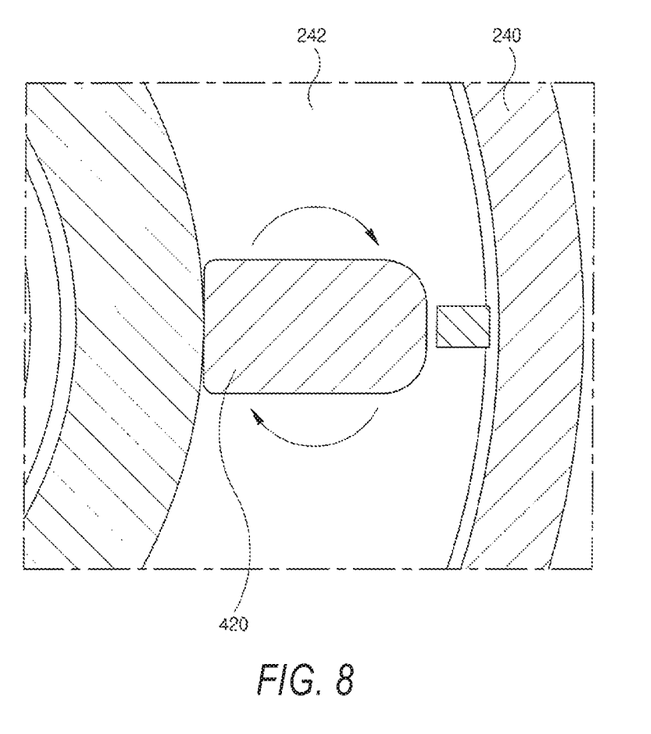
FIG. 8 is a horizontal section view of the slide block installed in the rotation groove.

FIG. 6 is an oblique view of the drain pin (400), FIG. 7 is an oblique view of the drain pin (400) sliding along the rotation groove (242) when the cap (300) is combined with the casing (100) in screwed connection mode, and FIG. 8 is a horizontal section view of the slide block (420) installed in the rotation groove (242).

After the drain pin (400) is inserted into the drain nipple (310), said drain pin (400) can be lifted so that the top of the drain pin (400) touches closely against the bottom surface of the bottom support plate (240). When a vehicle is running, to keep the drain pin (400) from separating from the drain nipple (310), namely, to prevent the drain pin (400) from falling off, it is structurally optimal that the top of the drain nipple (310) is snapped into the bottom support plate (240). That is to say, when said drain pin (400) is inserted into said drain nipple (310), the top of the drain nipple is hung on or released from the bottom support plate (240), depending on the rotation degree.

To achieve the above-mentioned combination, an annular rotation groove (242) is formed on the bottom surface of said bottom support plate (240), with the rotation axis of the casing (100) being the central axis, and the entrance is narrower than the bottom surface when said rotation groove (242) is manufactured. In this case, a through-hole (244) can be formed in the external wall of said rotation groove (242) to let engine oil run smoothly. Further, said drain pin (400) comprises the following structures: a body (410) inserted into said drain hole (312) in fit mode, a slide block (420) which is located at one lengthwise end (top end in the embodiment) of said body (410) and placed on the bottom surface of said rotation groove (242) and can slide along said rotation groove (242) as said cap (300) rotates in the screwed connection direction, and a handle (430) which is located at the other lengthwise end (bottom end in the embodiment) of said body (410) and is exposed to the outside of said drain nipple (310) when said body (410) is inserted into the drain nipple (310).

In this case, the lateral length of said slide block (420) is greater than the entrance width of said rotation groove (242), and the longitudinal length of said slide block (420) is smaller than the entrance width of said rotation groove (242). Therefore, when said slide block (420) is laterally aligned to the radial direction (see FIG. 9) of said rotation groove (242), the slide block (420) will not be separated from the rotation groove (242) and will remain inserted in said rotation groove (242); when said slide block (420) is laterally aligned to the tangential direction (see FIG. 10) of said rotation groove (242), the slide block (420) can be inserted into or removed from the rotation groove (242).

In addition, when the slide block (420) of the drain pin (400) is inserted into the rotation groove (242) on the bottom support plate (240) and is supplied to an assembly factory, an assembler needs to turn the cap (300) and combine the cap with the casing (100) in screwed connection mode, with the lower end of the body (410) inserted into the drain hole (312). However, if said rotation groove (242) is manufactured into a single dented groove, it is impossible to rotate the drain pin (400) and the cap (300) together. Of course, when the drain pin (400) is installed on the rotation axis of the cap (300), the cap (300) can also be rotated, even if the rotation groove (242) is manufactured into a single dented groove. In this case, the drain pin (400) and the bypass valve (500) interfere with each other, however, and thus said cap (300) needs to be manufactured in an elongate manner in the upward and downward directions.

In the oil filter assembly in the present invention, even if the drain pin (400) is set a certain distance away from the rotation axis of the cap (300), said rotation groove (242) is preferably manufactured into an annular groove with the central axis being the rotation axis of the cap (300) so as to keep said drain pin (400) rotating together with said cap (300) during the rotation of the cap (300). As described above, when said rotation groove (242) is manufactured into an annular groove, said slide block (420) will laterally be aligned to the radial direction of the rotation groove (242), that is to say said slide block (420) remains hung in the entrance of the rotation groove (242), and therefore said slide block (420) can rotate with the rotation axis of the cap (300) being the central axis and the cap (300) can rotate free of interference from the drain pin (400).

In addition, when said slide block (420) slides along the rotation groove (242), the slide block is preferably manufactured into a structure with polygonal edges to keep the slide block (420) always laterally aligned to the radial direction of the rotation groove (242) and one lateral end (422) of said slide block (420) touching the internal side wall of said rotation groove (242). As shown in FIG. 8, when one lateral end (422) of said slide block (420) touches the internal side wall of said rotation groove (242), even if an external force is applied to said slide block (420) in the direction indicated by the arrows, said slide block (420) will not rotate so that said slide block (420) remains laterally aligned to the radial direction of the rotation groove (242) and revolves around the rotation axis of the cap (300).

Further, to keep one lateral end (422) of the slide block (420) wholly touching the internal side wall of the rotation groove (242), the lateral end (422) of said slide block (420) can be manufactured into a curved shape and the curvature is the same as that of the internal side wall of the rotation groove (212). As described above, when the lateral end (422) of the slide block (420) is manufactured into a curved shape, said slide block (420) will not rotate at all in the direction indicated by arrows in FIG. 8 and thus the reliability of the combination between the slide block (420) and the rotation groove (242) can further be improved.

When you remove said drain pin (400), you need to rotate said drain pin (400). In this case, if said slide block (420) is made of a material with almost no elasticity, such as a metal, you cannot rotate said drain pin (400) since the edges of said slide block (420) are snapped into the internal side wall of the rotation groove (242). Therefore, said slide block (420) should be made of a material with elasticity above the standard value, such as synthetic resin, so that the edges of the slide block can cross the internal side wall of the rotation groove (242) when you apply a force, but said slide block will not rotate under the action of vibrations of the engine.

Figure 9:
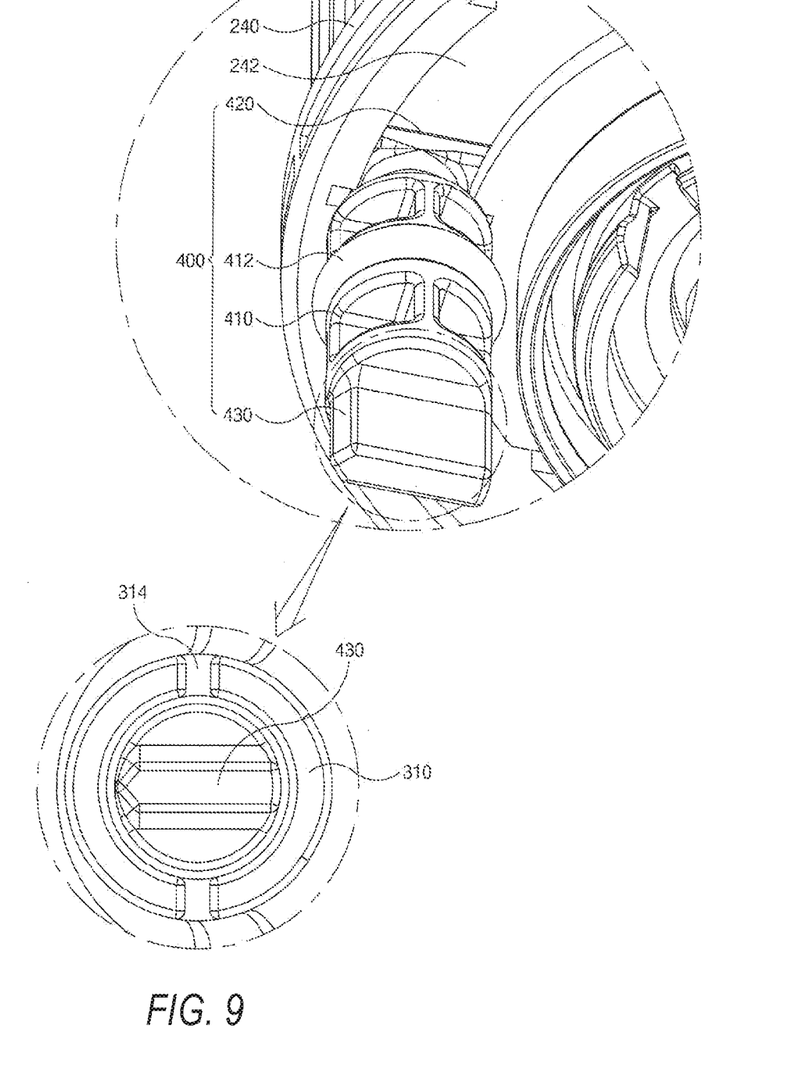
FIG. 9 and FIG. 10 show the service state of the oil filter assembly in the present invention.
Figure 10:
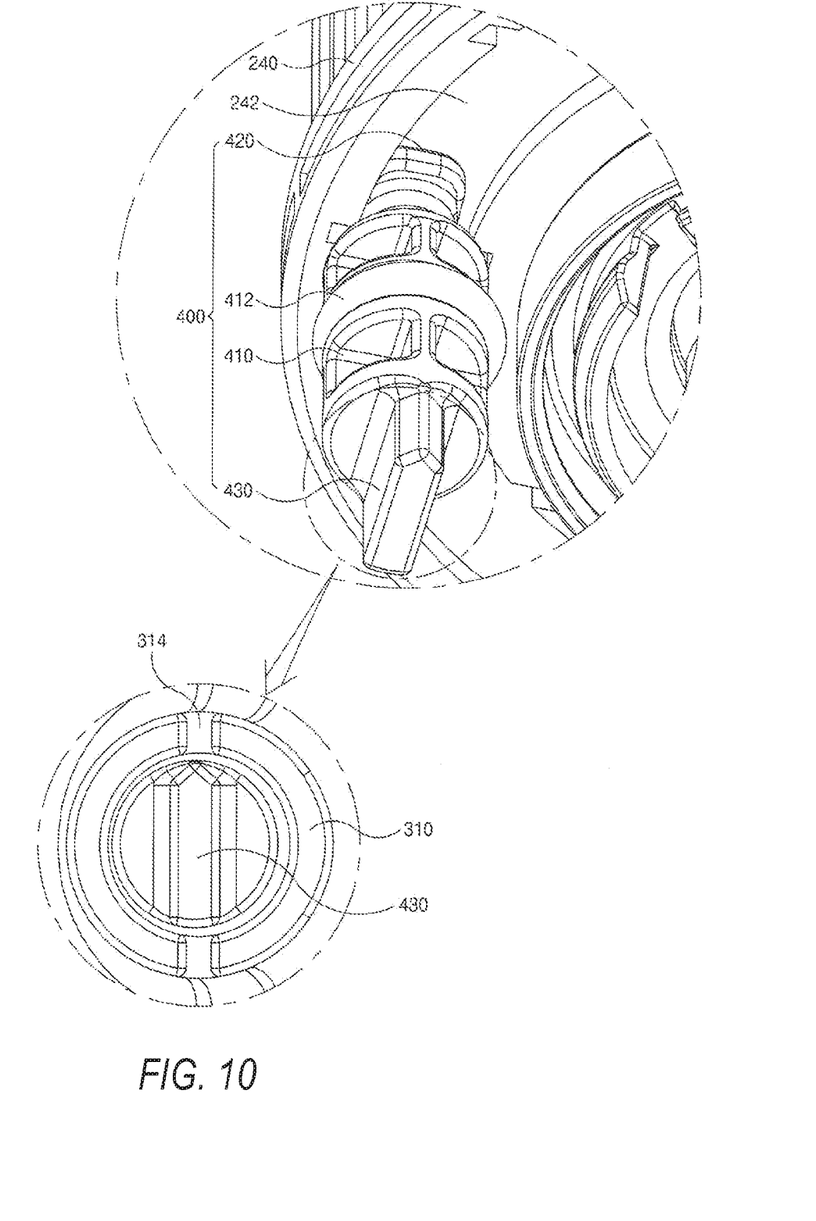
Figure 11:
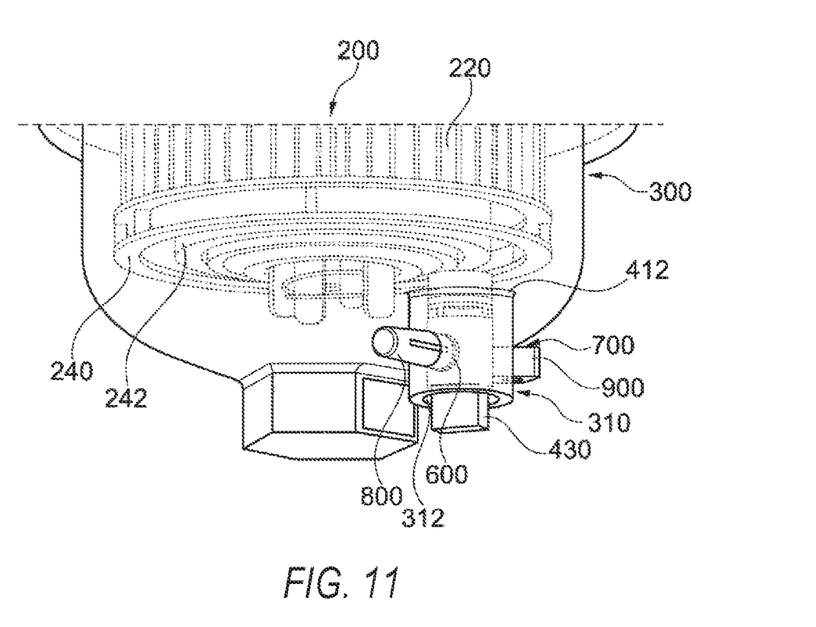
FIG. 11 shows another embodiment of the inventional oil filter assembly with an additional safety pin.
Figure 12:
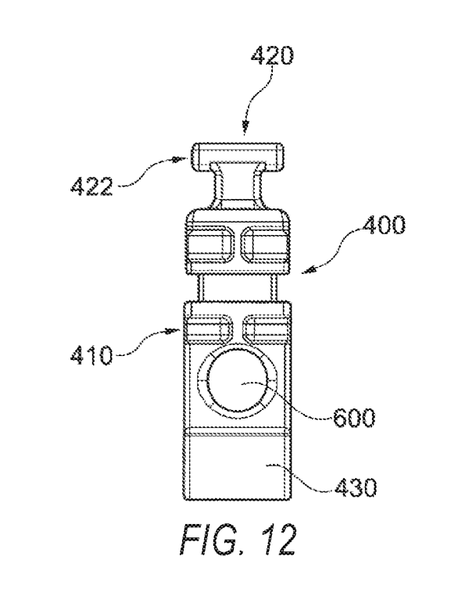
FIG. 12 shows a drain pin with a through-hole for a safety pin.

FIG. 9 and FIG. 10 show the service state of the oil filter assembly in the present invention.

To prevent the slide block (420) of the drain pin (400) from being separated from the rotation groove (242), you should align the lateral direction (the direction with a larger length) of the slide block (420) to the radial direction of the rotation groove (242), as shown in FIG. 9.

On the contrary, to separate the slide block (420) of the drain pin (400) from the rotation groove (242), you should rotate the slide block (420) and align the lateral direction (the direction with a larger length) to the tangential direction of the rotation groove (242), as shown in FIG. 10. However, it may be difficult for the operator to rotate the drain pin (400) by a correct angle since said slide block (420) is blocked by the cap (300) and the alignment cannot be confirmed visually.

To this end, marking grooves (314) are formed in the radial direction of the drain nipple (310) on the protruding end of the drain nipple (310) and said handle (430) is manufactured into a downward extended plate. When you rotate the drain pin (400) to keep the lateral direction of the slide block (420) aligned to the radial direction of the rotation groove (242), you can set the two ends in the amplitude direction of the handle (430) aligned to said marking grooves (314), as shown in FIG. 9. On the contrary, when you rotate the drain pin (400) to keep the lateral direction of the slide block (420) aligned to the tangential direction of said rotation groove (242), you can set the two ends in the amplitude direction of the handle (430) to be located between a pair of marking grooves (314), as shown in FIG. 10.

As described above, when marking grooves (314) are formed on the drain nipple (310), the operator can rotate the drain pin (400) by a correct angle by confirming the direction of the handle (430) and the positions of marking grooves (314), and then can easily separate the drain pin (400) to discharge engine oil.

The present invention is described in detail above with reference to the preferred embodiment of the present invention. The scope of the present invention is not limited to a specific embodiment, but should be explained according to the attached claims. Further, those skilled in the art should understand that modifications and variations can be made without departing from the scope of the present invention.

The invention claimed is:

1. An oil filter module comprising:
   a casing having an open end;
   a filter installed in the casing and including:
      a pipe-shaped support frame having a plurality of openings in a sidewall thereof;
      a filter paper enclosing an outer surface of the support frame;
      an upper support plate coupled to the support frame and configured to cover an upper end of the filter paper; and
      a bottom support plate coupled to the support frame and configured to cover a lower end of the filter paper;
   a cap threadedly coupled to the casing to cover the open end of the casing, the cap including a drain nipple protruding downward from a portion of the cap corresponding to the bottom support plate, with a drain hole formed in the drain nipple; and
   a drain pin coupled to the drain nipple so as to be removable so that the drain hole formed in the drain nipple is opened or closed by the drain pin,
   wherein an annular rotation groove having a rotating axis of the casing as a central axis thereof is formed in a lower surface of the bottom support plate,
   the drain hole is formed at a position corresponding to the rotation groove, and
   the drain pin is seated at one end thereof onto a bottom of the rotation groove when the drain pin is coupled to the drain nipple.

2. The oil filter module according to claim 1, wherein the drain pin comprises:
   a pin body inserted into the drain hole in a force-fitting manner;
   a slide block seated on the bottom of the rotation groove and formed on a first longitudinal end of the pin body in a block shape such that the slide block can slide along the rotation groove when the cap is rotated in a direction in which the cap is threadedly rotated;
a handle provided on a second longitudinal end of the pin body and exposed outside the drain nipple; and
a sealing element provided to enclose an outer surface of the pin body.

3. The oil filter module according to claim 2, wherein the rotation groove is formed such that a width of a bottom surface of the rotation groove is less than a width of an entrance into the rotation groove,
a longitudinal length of the slide block is greater than the entrance width of the rotation groove, and
a lateral width of the slide block is less than the entrance width of the rotation groove.

4. The oil filter module according to claim 3, wherein the slide block is made of a material having an elasticity higher than a reference value, and
when the drain pin is oriented such that a longitudinal direction of the slide block corresponds to a diameter direction of the rotation groove, a longitudinal end of the slide block comes into contact with an inner sidewall of the rotation groove.

5. The oil filter module according to claim 3, wherein a longitudinal end of the slide block has a curved shape corresponding to a curvature of the inner sidewall of the rotation groove.

6. The oil filter module according to claim 2, wherein a marking slot having a length in a diameter direction of the drain nipple is formed in a protruding end of the drain nipple,
the handle has a plate shape extending downward, and
when the drain pin is oriented such that a longitudinal direction of the slide block corresponds to a diameter direction of the rotation groove, opposite lateral sides of the handle corresponds to the marking groove.

7. The oil filter module according to claim 4, wherein a longitudinal end of the slide block has a curved shape corresponding to a curvature of the inner sidewall of the rotation groove.

8. The oil filter module according to claim 3, wherein a marking slot having a length in a diameter direction of the drain nipple is formed in a protruding end of the drain nipple,
the handle has a plate shape extending downward, and
when the drain pin is oriented such that a longitudinal direction of the slide block corresponds to a diameter direction of the rotation groove, opposite lateral sides of the handle corresponds to the marking groove.

9. The oil filter module according to claim 4, wherein a marking slot having a length in a diameter direction of the drain nipple is formed in a protruding end of the drain nipple,
the handle has a plate shape extending downward, and
when the drain pin is oriented such that a longitudinal direction of the slide block corresponds to a diameter direction of the rotation groove, opposite lateral sides of the handle corresponds to the marking groove.

10. The oil filter module according to claim 5, wherein a marking slot having a length in a diameter direction of the drain nipple is formed in a protruding end of the drain nipple,
the handle has a plate shape extending downward, and
when the drain pin is oriented such that a longitudinal direction of the slide block corresponds to a diameter direction of the rotation groove, opposite lateral sides of the handle corresponds to the marking groove.

11. An oil filter module comprising:
a casing having an open end;
a filter installed in the casing and including:
a pipe-shaped support frame having a plurality of openings in a sidewall thereof;
a filter paper enclosing an outer surface of the support frame;
an upper support plate coupled to the support frame and configured to cover an upper end of the filter paper; and
a bottom support plate coupled to the support frame and configured to cover a lower end of the filter paper;
a cap threadedly coupled to the casing to cover the open end of the casing, the cap including a drain nipple protruding downward from a portion of the cap corresponding to the bottom support plate, with a drain hole formed in the drain nipple; and
a drain pin coupled to the drain nipple so as to be removable so that the drain hole formed in the drain nipple is opened or closed by the drain pin, the drain pin including:
a pin body inserted into the drain hole in a force-fitting manner;
a slide block seated on the bottom of the rotation groove and formed on a first longitudinal end of the pin body in a block shape such that the slide block can slide along the rotation groove when the cap is rotated in a direction in which the cap is threadedly rotated;
a handle provided on a second longitudinal end of the pin body and exposed outside the drain nipple; and
a sealing element provided to enclose an outer surface of the pin body,
wherein an annular rotation groove having a rotating axis of the casing as a central axis thereof is formed in a lower surface of the bottom support plate,
the drain hole is formed at a position corresponding to the rotation groove, and
the drain pin is seated at one end thereof onto a bottom of the rotation groove when the drain pin is coupled to the drain nipple.

12. The oil filter module according to claim 11, further comprising a safety pin insertable in a through-hole passing through the drain pin and the drain nipple to maintain the drain pin in the drain hole.

13. The oil filter module according to claim 12, wherein the through-hole is positioned below the sealing element.

14. The oil filter module according to claim 1, further comprising a safety pin insertable in a through-hole passing through the drain pin and the drain nipple to maintain the drain pin in the drain hole.

15. The oil filter module according to claim 14, wherein the safety pin includes a handle at one end and elastic elements configured to grab behind an edge of the through-hole when the safety pin is fully inserted in the through-holes.

* * * * *